United States Patent
Enomoto

(10) Patent No.: US 11,248,991 B2
(45) Date of Patent: Feb. 15, 2022

(54) THIN-SECTION PREPARATION METHOD AND THIN-SECTION PREPARATION DEVICE

(71) Applicant: SAKURA FINETEK JAPAN CO., LTD., Tokyo (JP)

(72) Inventor: Jyunya Enomoto, Tokyo (JP)

(73) Assignee: SAKURA FINETEK JAPAN CO., LTD., Tokyo (JP)

( * ) Notice: Subject to any disclaimer, the term of this patent is extended or adjusted under 35 U.S.C. 154(b) by 386 days.

(21) Appl. No.: 14/441,384

(22) PCT Filed: Nov. 6, 2013

(86) PCT No.: PCT/JP2013/080008
§ 371 (c)(1),
(2) Date: May 7, 2015

(87) PCT Pub. No.: WO2014/073564
PCT Pub. Date: May 15, 2014

(65) Prior Publication Data
US 2015/0300925 A1    Oct. 22, 2015

(30) Foreign Application Priority Data
Nov. 8, 2012    (JP) .............................. JP2012-246338

(51) Int. Cl.
*G01N 1/06*    (2006.01)
*B26D 3/28*    (2006.01)
(Continued)

(52) U.S. Cl.
CPC ................. *G01N 1/06* (2013.01); *B26D 3/28* (2013.01); *B26D 5/00* (2013.01); *B26D 7/26* (2013.01);
(Continued)

(58) Field of Classification Search
CPC ............... G01N 1/06; G01N 2001/061; G01N 2001/063; B26D 3/28; B26D 5/00;
(Continued)

(56) References Cited

U.S. PATENT DOCUMENTS 3,667,330 A    6/1972    Kobernick
5,181,443 A    1/1993    Sitte et al.
(Continued)

FOREIGN PATENT DOCUMENTS

CN    104755903    7/2015
JP    11-153521    6/1999
(Continued)

OTHER PUBLICATIONS

Office Action from related Chinese Appln. No. 2013800570742 dated May 31, 2016. English translation attached.
(Continued)

*Primary Examiner* — Clark F Dexter
(74) *Attorney, Agent, or Firm* — Grossman, Tucker, Perreault & Pfleger, PLLC

(57) ABSTRACT

A thin-section preparation method and device includes, in a one-blade set state where an entire first cutting blade is held by a holder, performing a first rough cutting step of rough cutting an embedded block using a first end region of the first cutting blade, and a first main cutting step of main cutting the embedded block using a second end region of the first cutting blade; and further includes, in a two-blade set state where the second end region of the first cutting blade and a first end region of a second cutting blade are held by the holder, performing a second rough cutting step of rough cutting the embedded block using the second end region of the first cutting blade, and a second main cutting step of main cutting the embedded block using the first end region of the second cutting blade.

11 Claims, 6 Drawing Sheets

(51) Int. Cl.
  *B26D 5/00* (2006.01)
  *B26D 7/26* (2006.01)
(52) U.S. Cl.
  CPC ........ *B26D 7/2628* (2013.01); *B26D 2210/00* (2013.01); *Y10S 83/9155* (2013.01)
(58) Field of Classification Search
  CPC .... B26D 7/26; B26D 7/2628; B26D 2210/00; Y10S 83/9155
  USPC ........................................................ 83/915.5
  See application file for complete search history.

(56) References Cited

U.S. PATENT DOCUMENTS

| | | | |
|---|---|---|---|
| 5,461,953 | A | 10/1995 | McCormick |
| 5,535,654 | A | 7/1996 | Niesporek et al. |
| 5,713,255 | A | 2/1998 | Izvozichikov et al. |
| 7,503,248 | B2 | 3/2009 | Studer |
| 2007/0157786 | A1 | 7/2007 | Miyatani et al. |
| 2007/0204734 | A1 | 9/2007 | Ito et al. |
| 2008/0202308 | A1 | 8/2008 | Fujiwara et al. |

FOREIGN PATENT DOCUMENTS

| | | |
|---|---|---|
| JP | 2001-013046 | 1/2001 |
| JP | 2001-289747 | 10/2001 |
| JP | 2008-209303 | 9/2008 |

OTHER PUBLICATIONS

Office Action (Restriction Requirement) from related U.S. Appl. No. 12/275,588 dated Apr. 28, 2011.

Office Action (non-final) from related U.S. Appl. No. 12/275,588 dated Jun. 30, 2011.

Office Action (non-final) from related U.S. Appl. No. 13/238,922 dated May 31, 2013.

Office Action (final) from related U.S. Appl. No. 13/238,922 dated Oct. 21, 2013.

Office Action (non-final) from related U.S. Appl. No. 13/238,922 dated Mar. 11, 2014.

International Search Report from corresponding PCT Application No. PCT/JP2013/080008 dated Dec. 3, 2013. English translation attached.

THIN-SECTION PREPARATION METHOD AND THIN-SECTION PREPARATION DEVICE

TECHNICAL FIELD

The present invention relates to a thin-section preparation method and a thin-section preparation device.

Priority is claimed on Japanese Patent Application No. 2012-246338, filed Nov. 8, 2012, the content of which is incorporated herein by reference.

BACKGROUND ART

As one of the methods for inspecting and observing a biological sample extracted from a human body, experimental animal, or the like, a method is known in which a thin section is prepared from an embedding block in which the biological sample is embedded by an embedding agent, dye processing is performed on the thin section, and thus, the biological sample is observed.

In the related art, an operation of preparing the thin section is performed manually by an experienced operator using a sharp and thin cutting blade. However, in recent years, an automatic thin-cutting device capable of automatically performing the operation of preparing the thin section has begun to be in use. According to this thin-cutting section preparing device, it is possible to continuously prepare the thin section without imposing a burden on the operator.

Specifically, in the thin-section preparation devices, first, rough cutting of the embedded block is performed by the cutting blade, whereby the surface of the embedded block is made into a smooth surface, and surface shaping of the embedded biological sample that is an object to be examined or observed is performed.

Next, the above-described thin section can be obtained by performing main cutting of the embedded block, which has been subjected to the surface shaping, with a predetermined thickness (for example, 3 μm to 5 μm).

By the way, when the thin section is prepared by cutting the embedded block, it is necessary to cut the embedded block with the above-described predetermined thickness in order to prepare a high-quality thin section. If thin cutting is performed with the sharpness of the cutting blade being poor, it is difficult to cut the embedded block with a desired thickness. Additionally, a thin section may be damaged depending on the case.

Here, a configuration in which two cutting blades (a first cutting blade and a second cutting blade) are held side by side along a blade edge direction by a holder, and rough cutting and main cutting are separately performed by the first cutting blade and the second cutting blade is disclosed in Patent Document 1, for example.

Additionally, a configuration in which cutting spots of an embedded block in one cutting blade are changed in a timely manner when shifting from rough cutting to main cutting, or when sharpness deteriorates is disclosed in Patent Document 2.

According to these configurations, it is mentioned that particularly the sharpness in the main cutting that requires high precision can be maintained by changing the cutting spots of the cutting blade(s) in the rough cutting and the main cutting.

PRIOR ART DOCUMENTS

Patent Documents

Patent Document 1: Japanese Unexamined Patent Application, First Publication No. 2001-289747

Patent Document 2: Japanese Unexamined Patent Application, First Publication No. H11-153521

SUMMARY OF INVENTION

Problems to be Solved by the Invention

However, since the holder holds the two cutting blades in the configuration of the above-described Patent Document 1, the holder has a width equivalent to the two cutting blades. In this case, for example, there is a problem in that the size of the holder becomes large and the rigidity of the holder deteriorates with the enlargement of the holder.

Additionally, in the configuration of the above-described Patent Document 1, the first cutting blade is used only for the rough cutting and the second cutting blade is used only for the main cutting. Thus, a new cutting blade is also used for the rough cutting that requires low precision compared to the main cutting. Therefore, it is difficult to effectively use the cutting blades.

Moreover, in the configuration of Patent Document 2, the entire cutting blade can be used by changing the cutting spots, for example, when shifting from the rough cutting to the main cutting. However, it is difficult to reuse a spot used once for cutting. In this case, a new spot is also used for the rough cutting. As a result, effective use of the cutting blade is also difficult similar to the above-described Patent Document 1.

The aspects of the invention have been made in consideration of such circumstances, and an object of the invention is to provide a thin-section preparation device that can achieve miniaturization of a holder holding a cutting blade as well as the cutting blade being effectively used.

Means for Solving the Problems

The following configurations are used in a thin-section preparation method and a thin-section preparation device related to an aspect of the invention.

(1) A thin-section preparation method related to an aspect of the invention is a thin-section preparation method for preparing a thin section by cutting an embedded block using a cutting blade held by a holder, the thin-section preparation method including: a first rough cutting step of performing rough cutting of the embedded block in one end region of a first cutting blade along a blade edge direction, in a one-blade set state where entire the first cutting blade of the cutting blade is held by a holder in the blade edge direction; a first main cutting step of performing main cutting of the embedded block on which has been performed rough cutting in another end region of the first cutting blade along the blade edge direction in the one-blade set state; a second rough cutting step of performing rough cutting of the embedded block in the other end region of the first cutting blade, in a two-blade set state where the other end region of the first cutting blade and one end region of a second cutting blade of the cutting blade along the blade edge direction are held by the holder; and a second main cutting step of performing main cutting of the embedded block in the one end region of the second cutting blade in the two-blade set state.

(2) A thin-section preparation device related to an aspect of the invention is a thin-section preparation device including a cutting blade that has a blade edge which cuts an embedded block in which a biological sample is embedded and that is long in a blade edge direction; a holder configured to detachably hold the cutting blade in a state where the blade edge is exposed to an outside; and a controller configured to perform switching between a one-blade set state and a two-blade set state, the one-blade set state being a state where an entire first cutting blade along the blade edge direction is held by a holder, the two-blade set state being a state where the other end region of the first cutting blade and one end region of a second cutting blade of the cutting blade along the blade edge direction are held by the holder, the first cutting blade including one end region of the first cutting blade of the cutting blade along the blade edge direction and another end region of the first cutting blade along the blade edge direction, wherein the controller, in the one-blade set state, performs rough cutting of the embedded block in the one end region of the first cutting blade and performs main cutting on the embedded block on which has been performed rough cutting in the other end region of the first cutting blade, and wherein the controller, in the two-blade set state, performs rough cutting of the embedded block in the other end region of the first cutting blade and performs main cutting of the embedded block in the one end region of the second cutting blade.

According to the above configuration, the cutting blade can be effectively used by separately performing the rough cutting and the main cutting in the one end region and the other end region among the one cutting blade and then using the portion of the cutting blade which was used for the main cutting as for the rough cutting with lower precision compared to the main cutting. Therefore, the running costs of the thin-section preparation device when the thin section is prepared can be reduced.

Additionally, by performing switching between the one-blade set state where the entire first cutting blade in the blade edge direction is held and the two-blade set state where the other end region of the first cutting blade and the one end region of the second cutting blade are held, the two cutting blades can be held by the holder having the same width as that of the one cutting blade. Accordingly, miniaturization of the holder is achieved, and the rigidity of the holder can be improved with this miniaturization.

(3) In the above thin-section preparation device of the above aspect (2), the holder may include a placing plate on which the cutting blade is placed; and a pressing plate configured to press the cutting blade placed on the placing plate, and wherein the pressing plate includes: a first pressing plate configured to hold a region of the cutting blade in which rough cutting is performed; and a second pressing plate configured to hold a region of the cutting blade in which main cutting is performed.

According to the above configuration, the pressing plate of the holder includes the first pressing plate and the second pressing plate. Therefore, especially when two different cutting blades are held by the holder in the above-described two-blade set state, the cutting blades can be respectively pressed by the separate first pressing plate and the separate second pressing plate. Accordingly, the dimension errors of the respective cutting blades in the thickness direction can be absorbed, and the respective cutting blades can be stably held even in the two-blade set state.

(4) In the above thin-section preparation method of the above aspect (1), a thin section may be prepared by detachably holding the cutting blade by the holder in a state where the blade edge is exposed to an outside, and cutting the embedded block, in which a biological sample is embedded, by using the cutting blade, the cutting blade including the blade edge and being long in the blade edge direction.

Advantage of Invention

According to the thin-section preparation method and the thin-section preparation device related to the aspects of the invention, miniaturization of the holder holding the cutting blade can be achieved as well as the cutting blade being effectively used.

DESCRIPTION OF EMBODIMENTS

Next, an embodiment of the present invention will be described with reference to the drawings.

<Configuration of Automatic Thin-Cutting Device>

Figure 1:
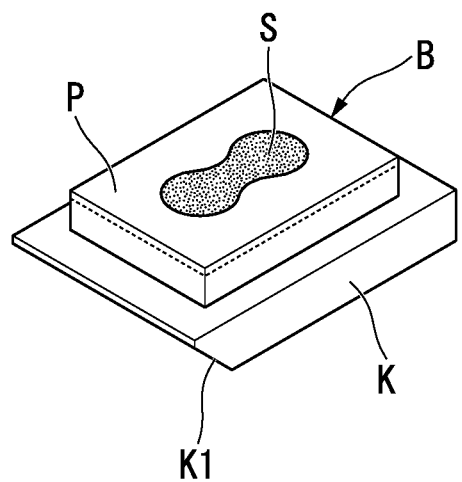
FIG. 1 is a perspective view of an embedded block conveyed in an automatic thin-cutting device related to an aspect of the invention.
Figure 2:
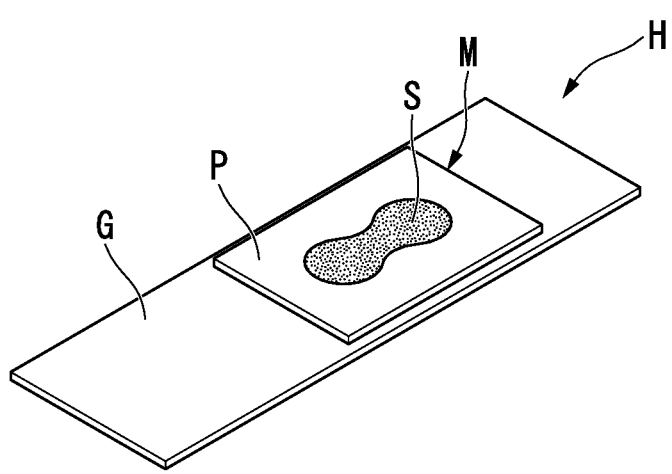
FIG. 2 is a perspective view of a thin section specimen prepared in the automatic thin-cutting device related to the aspect of the invention.

FIG. 1 is a perspective view of an embedding block B which is conveyed by an automatic thin-cutting device 1. FIG. 2 is a perspective view of a thin section sample H which is prepared by the automatic thin-cutting device 1.

As shown in FIG. 1, the automatic thin-cutting device 1 (refer to FIG. 3) of the present embodiment is a device which thinly cuts the embedding block B, in which a biological sample S is embedded by a paraffin P serving as an embedding material, to a thickness of 3 μm to 5 μm, for example. Accordingly, it is possible to prepare a thin section M shown in FIG. 2 by the automatic thin-cutting device 1.

In addition, the automatic thin-cutting device 1 of the present embodiment not only can prepare the thin section M but also can automatically perform an operation of storing the thin section samples H in a basket after transferring the thin section M to the substrate such as a slide glass G and preparing the thin section samples H.

In addition, the embedding block B is a rectangular block in a plan view in which moisture in the formalin-fixed biological sample S is paraffin-substituted, and thereafter, the periphery is hardened in a block shape by the paraffin P. Accordingly, the biological sample S is embedded in the paraffin P. In addition, for example, the biological sample S is a tissue such as an internal organ extracted from a human body, experimental animal, or the like, and is a tissue which is appropriately selected in a medical field, a pharmaceutical field, a food field, a biological field, or the like.

In addition, as shown in FIG. 1, the embedding block B is fixed to a cassette K.

The cassette K is formed in a box shape by a resin having chemical resistance or the like, and has a role as a fixing table which fixes the embedding block B. One side surface of the cassette K is an inclined surface K1 in which the surface faces downward. ID data (not shown), which includes a production number of the cassette K, a preparation date of the embedding block B, various data of the biological sample S, or the like, is recorded on the inclined surface K1. Accordingly, it is possible to manage the quality of the embedding block B by reading the ID data.

Subsequently, each component of the automatic thin-cutting device 1 will be described.

In the present embodiment, first, components configuring the automatic thin-cutting device 1 are sequentially and simply described, and thereafter, the necessary components are described in detail.

Figure 3:
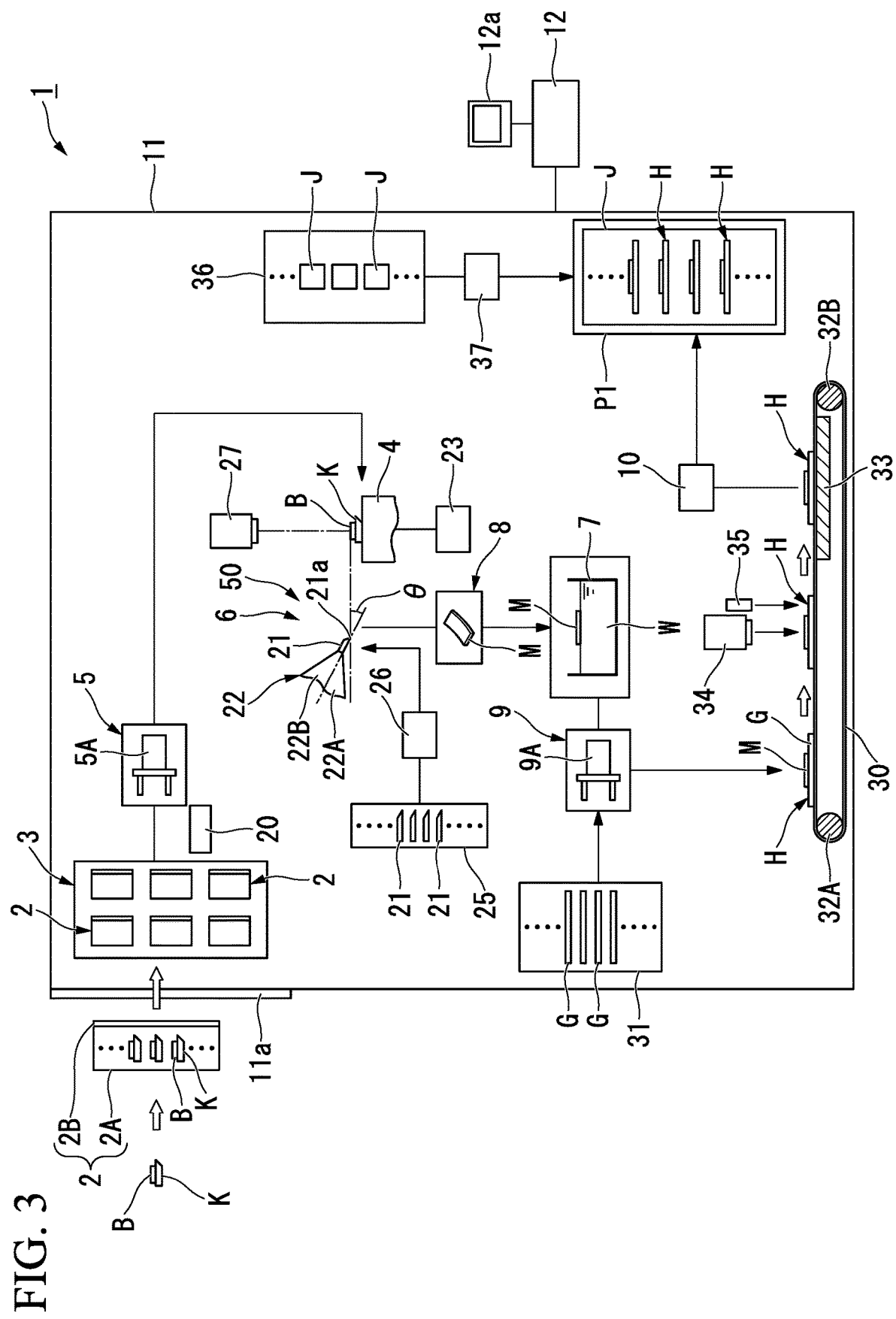
FIG. 3 is a schematic configuration diagram of the automatic thin-cutting device.

As shown in FIG. 3, the automatic thin-cutting device 1 mainly includes a plurality of magazines 2 in which a plurality of embedded blocks B are stored so as to be inserted or removed, a carousel 3 on which each of the magazines 2 are individually detachably mounted; a block conveying mechanism 5 that inserts or removes one embedded block B selected from the plurality of embedded blocks B housed in each magazine 2 mounted on the carousel 3 and that places the selected embedded block on a stage 4; a thin-cutting mechanism 6 that cuts the embedded block B placed on the stage 4 with a predetermined thickness, and cuts out a thin section M; a thin section conveying mechanism 8 that conveys the thin section M cut out by the thin-cutting mechanism 6 to a storage tank 7 and floats the thin section M on a liquid surface to spread the thin section M; a slide glass handling mechanism 9 that scoops up the spread thin section M from the liquid surface onto the slide glass G, and prepares the thin section sample H; a slide glass housing mechanism 10 that stores the prepared thin section sample H in a basket J; a device case 11 that accommodates the components in the inner portion; and a controller 12 that totally controls the components.

(Device Case)

The inner portion of the above-described device case 11 can be sealed, and for example, in the inner portion, an environmental condition such as humidity, temperature, or the like can be set to a desired condition. An access door 11a which is opened and closed by an operator is provided on the wall surface of the device case 11. The access door 11a is a door which is used when the magazine 2 is mounted or extracted. By opening the access door 11a, access to the carousel 3 on which the magazine 2 is mounted is possible.

(Magazine)

The magazine 2 is a storage case in which the entirety is formed in a vertically long rectangular parallelepiped shape. The magazine 2 can store the plurality of embedding blocks B fixed to the cassettes K in a state where the embedding blocks B are arranged in a height direction. The magazine 2 mainly includes a box-shaped magazine main body 2A in which the front surface is opened, and an opening and closing door 2B which is fixed to the magazine main body 2A.

When the opening and closing door 2B is in a closed state, a portion of the plurality of embedding blocks B stored in the magazine main body 2A is covered, and thus, dropping of the embedding block B is prevented. Accordingly, the operator can carry the magazine 2 at ease without paying attention to the dropping of the embedding block B.

(Carousel)

The magazine 2 configured as described above is detachably mounted on the carousel 3. In the illustrated example, six magazines 2 are simultaneously mounted on the carousel 3.

The carousel 3 is disposed at a position at which access is possible from the outside by opening an access door 11a of the device case 11. Accordingly, the magazine 2 can be mounted on the carousel 3 or removed from the carousel 3 manually by the operator.

In addition, the carousel 3 can rotate about a vertical axis. The carousel 3 moves the magazine 2 mounted by the rotation in a circumferential direction, and can set one selected magazine 2 to a block extraction position at which the magazine 2 faces the block transport mechanism 5. Moreover, the operation of the carousel 3 is controlled by the controller 12.

(Reading Unit)

A reading unit 20, which reads ID data printed on the cassette K of each embedding block B which is stored in the magazine 2 positioned at the above-described block extraction position, is disposed at a position adjacent to the carousel 3.

For example, the reading portion 20 and the magazine 2 positioned at the block extraction position are configured to move relative to each other in a vertical direction. According to this relative movement, the reading portion 20 can read the ID data printed on the cassette K of all embedding blocks B stored in the magazine 2. In addition, the reading portion 20 optically reads the ID data and outputs the read ID data to the controller 12.

(Block Conveying Mechanism)

The block transport mechanism 5 is a handling robot which includes a hand portion 5A capable of holding the cassette K which fixes the embedding block B and is positioned at the position adjacent to the carousel 3. Based on the instruction from the controller 12, the block transport mechanism 5 holds one embedding block B, which is stored in the magazine 2 positioned at the block extraction position among the magazines 2 mounted on the carousel 3, by the hand portion 5A, can insert and remove the held embedding block B from the magazine 2, or can place the embedding block on the stage 4.

(Stage)

In the stage 4, an actuator is incorporated into the inner portion, and the stage 4 is configured to appropriately move vertically based on the instructions from the controller 12. Accordingly, it is possible to adjust the height of the embedding block B placed on the stage 4, and it is possible to thinly cut the embedding block B at a desired thickness (for example, 5 µm).

In addition, the stage 4 is a multi-axial stage in which rotation about the vertical axis and swing about a horizontal axis (two axes) can be performed. Therefore, the stage 4 freely controls the posture of the embedding block B, and can set the orientation, the inclination, or the like of the embedding block B to a desired state.

(Thin-Cutting Mechanism)

The thin-cutting mechanism 6 includes a cutting blade 21 which is disposed in the vicinity of the stage 4, a holder 22 which holds the cutting blade 21 in an exchangeable manner, and a moving mechanism 23 that moves the stage 4 with respect to the cutting blade 21, and thinly cuts the embedding block B by the cutting blade 21.

The cutting blade 21 is a long blade in which one end side becomes a blade edge 21a and that is made of a magnetic substance, and is obliquely held (clamp-fixed) to the holder 22 with a predetermined rake angle θ. In addition, in the illustrated example, the blade edge 21a is a single edge. However, the blade edge may be a double edge.

The holder 22 mainly includes a placing plate 22A on which the cutting blade 21 is placed in a state where the blade edge 21a is exposed to the outside, and a pressing plate 22B that presses the placed cutting blade 21 to the placing plate 22A, and the cutting blade 21 is clamp-fixed.

The moving mechanism 23 includes a guide rail (not shown) and a driving portion (not shown) which reciprocates the stage 4 along the guide rail at a predetermined speed. The moving mechanism 23 thinly cuts the embedding block B by the cutting blade 21 clamp-fixed by the holder 22 by reciprocating the stage 4 based on the instruction from the controller 12, and performs the cutting of the thin section M.

In addition, the stage 4 raises the embedding block B by a predetermined amount according to the reciprocation by the moving mechanism 23. Accordingly, the embedding block B is cut at a predetermined thickness, and it is possible to prepare the thin section M.

In addition, in the present embodiment, the moving mechanism 23 is configured so that the stage 4 side moves with respect to the cutting blade 21. However, the moving mechanism 23 may be configured so that the cutting blade 21 side moves with respect to the stage 4, or may be configured so that the holder 22 side and the stage 4 side move together.

In either case, the moving mechanism 23 may be designed in any manner as long as the embedding block B and the cutting blade 21 move relative to each other and the thin-cutting can be performed by the cutting blade 21.

(Housing Case and Cutting Blade Transport Mechanism)

A plurality of the cutting blades 21 are stored in the storage case 25 in a state of being multiply stacked, and after the cutting blades 21 are extracted one by one as necessary by the cutting blade transport mechanism 26, the cutting blade 21 is transported to the holder 22 and clamp-fixed. That is, the cutting blade 21 can be replaced at a predetermined timing.

Based on the instructions from the controller 12, the cutting blade transport mechanism 26 inserts a new cutting blade 21 extracted from the storage case 25 into a portion between the placing plate 22A controller and the pressing plate 22B in the holder 22, and pushes out and transports the used cutting blade 21 from the holder 22 by the inserted cutting blade 21. Accordingly, the replacement of the cutting blade 21 is performed, and after a new cutting blade 21 is set, the pressing plate 22B of the holder 22 is operated to perform the clamp-fixing of the new cutting blade 21 according to the instruction of the controller 12.

In addition, the used cutting blade 21 pushed out from the holder 22 is sent to a waste bottle (not shown) or the like via a waste chute (not shown) or the like.

(First Imaging Camera)

A first imaging camera 27 which images the embedding block B placed on the stage 4 is disposed above the stage 4. The first imaging camera 27 images the embedding block B which is illuminated by illumination light from a light source (not shown). In this case, the first imaging camera 27 can image the surface state or the internal state of the embedding block B according to the type (for example, vertical illumination light or diffused illumination light) of the illumination light.

In addition, the captured image is sent to the controller 12, is recorded, and for example, is displayed on a monitor 12*a* connected to the controller 12.

(Thin Section Conveying Mechanism)

Based on the instruction from the controller 12, the thin section conveying mechanism 8 is a mechanism which transports the thin section M cut by the thin-cutting mechanism 6 up to the storage tank 7 and floats the thin section M on the liquid surface. For example, the thin section conveying mechanism 8 may use a conveyance belt, a transport tape, or the like.

(Storage Tank)

A liquid W such as water which is adjusted to a predetermined temperature is stored in the storage tank 7, and in the storage tank 7, the thin section M floating on the liquid surface is spread using a surface tension. In addition, the stored liquid W is discharged from the storage tank 7 via a circulation pipeline (not shown) as necessary, and is supplied into the storage tank 7. Accordingly, a clear liquid W is stored in the storage tank 7 at all times.

(Slide Glass Handling Mechanism)

The slide glass handling mechanism 9 is a handling robot which includes the hand portion 9A capable of holding the slide glass G, and is disposed at a position adjacent to the storage tank 7. The slide glass handling mechanism 9 is operated based on the instruction from the controller 12 and scoops the spread thin section M floating on the liquid on the slide glass G held by the hand portion 9A to transfer the thin section M, and thus, it is possible to prepare the thin section sample H.

After the slide glass handling mechanism 9 scoops the thin section M on the slide glass G and prepares the thin section sample H, the slide glass handling mechanism 9 delivers the thin section sample H onto a sample conveyance belt 30, and thereafter, the slide glass handling mechanism 9 holds a new slide glass G among the slide glasses G stored in a slide glass storage portion 31 and moves the new slide glass G to a standby state for scooping the next thin section M.

The slide glass storage portion 31 is disposed in the vicinity of the storage tank 7, and for example, several dozens to several hundreds of unused slide glasses G are stored in the inner portion of the slide glass storage portion 31.

(Specimen Conveying Belt and Hot Plate)

For example, the above-described sample conveyance belt 30 is a conveyance belt which is wound between a driving pulley 32A and a driven pulley 32B which are driven based on the instruction from the controller 12. The sample conveyance belt 30 can transport the thin section sample H to the downstream side by driving of the driving pulley 32A.

The hot plate 33 which is heated to a predetermined temperature is disposed at the downstream side of the sample conveyance belt 30. The hot plate 33 heats the thin section sample H placed on the sample conveyance belt 30 in a state where the thin section sample H is interposed between the hot plate 33 and the sample conveyance belt 30. Accordingly, superfluous liquid W remaining on the thin section sample H can be removed by vaporization, and it is possible to further spread the thin section M while preventing the existence of the liquid W between the slide glass G and the thin section M.

(Second Imaging Camera and Recording Unit)

In the present embodiment, while the thin section sample H is conveyed up to the downstream side at which the hot plate 33 is disposed by the sample conveyance belt 30, the imaging of the thin-cutting state in the thin section M using a second imaging camera 34 and the printing of individual data to the slide glass G using a recording portion 35 are performed.

The second imaging camera 34 is disposed above the sample conveyance belt 30, images the thin section M until the thin section sample H placed on the sample conveyance belt 30 is conveyed to the downstream side, and sends the captured image to the controller 12. The captured image of the second imaging camera 34 sent to the controller 12 is recorded in the controller 12, and for example, is displayed on the monitor 12*a*.

For example, the recording portion 35 is a laser marker and is disposed to be adjacent to the second imaging camera 34, and based on the instructions from the controller 12, the recording portion 35 irradiates the slide glass G with laser light and performs the printing of the individual data. In this case, similar to the second imaging camera 34, the recording portion 35 performs the printing until the thin section sample H is conveyed to the downstream side.

(Slide Glass Housing Mechanism)

The slide glass storage mechanism 10 is disposed above the sample conveyance belt 30. The slide glass storage mechanism 10 is a mechanism which stores the thin section sample H on the sample conveyance belt 30 heated by the hot plate 33 in the basket J, based on the instruction from the controller 12. For example, as this mechanism, the thin section sample H is pushed out from the sample conveyance belt 30 using a pushing out rod driven by a cylinder or the like and may be stored in the basket J, or the thin section sample H may be stored in the basket J using a robotic hand or the like.

(Basket)

For example, the basket J is a dye basket, and can store several thin section samples H to several dozens of thin section samples H at once, and the plurality of baskets J are stored in a basket storage portion 36 in advance. After the baskets J stored in the basket storage portion 36 are sequentially extracted by a basket supply mechanism 37 which is operated based on the instruction from the controller 12, the baskets J are set at a sample storage position P1. At the sample storage position P1, the thin section samples H are stored in the basket J.

When the thin section samples H having the predetermined number of sheets are stored in the basket J, the basket J is sent into a storage cabinet (not shown) so as to be stored. At this time, warm wind adjusted to a predetermined temperature circulates through the storage cabinet, and thus, the thin section samples H are dried at an optimal state.

(Thin-Section Preparation Device)

Figure 4:
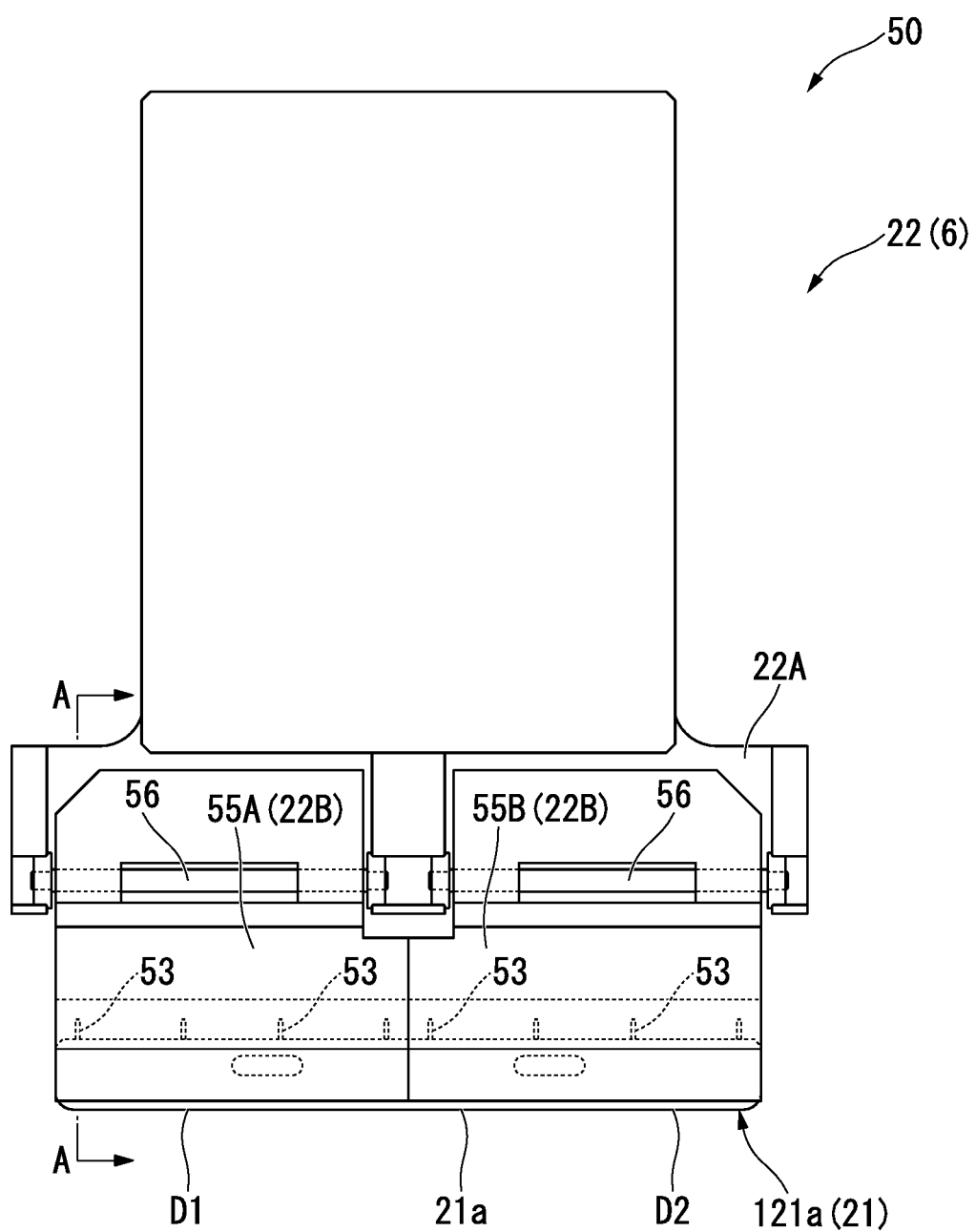
FIG. 4 is a plan view of a thin-section preparation device (holder).
Figure 5:
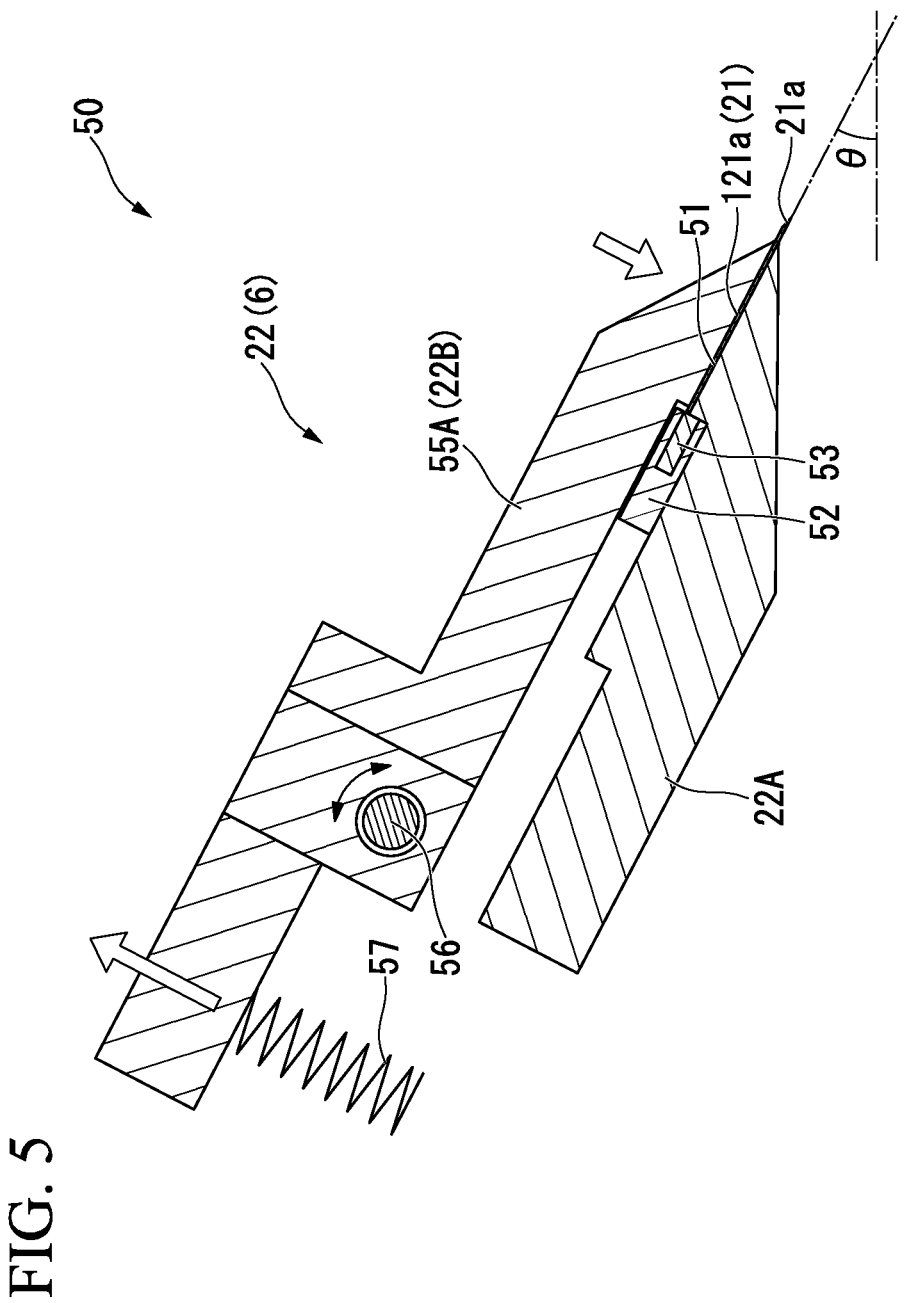
FIG. 5 is a cross-sectional view taken along line A-A of FIG. 4.

Next, the configuration of a thin-section preparation device 50 including the thin-cutting mechanism 6, the cutting blade transport mechanism 26, the controller 12, and the like among the above-described respective components will be described in more detail. FIG. 4 is a plan view of the thin-section preparation device 50 (holder 22). FIG. 5 is a cross-sectional view taken along line A-A of FIG. 4.

As shown in FIGS. 4 and 5, the placing plate 22A of the above-described holder 22 has a placement surface 51 on which the other end (opposite to the blade edge 21a) of the cutting blade 21 is placed along a blade edge direction in a state where the blade edge 21a formed at one end of the cutting blade 21 is exposed to the outside. In the present embodiment, the width of the placement surface 51 is equal to the width of the cutting blade 21 along the blade edge direction, and the entire cutting blade 21 in the blade edge direction is placed on the placement surface 51 in a state shown in FIG. 4 (one-blade set state to be described below).

A sheet plate 52 is joined to the placing plate 22A along the placement surface 51 in a state where the sheet plate is adjacent to the placement surface 51. A plurality of magnets 53 are embedded in and fixed to an end surface of the sheet plate 52 at set intervals. The magnets 53 attract the other end of the cutting blade 21 placed on the placement surface 51 by a magnetic force, and hold the posture of the cutting blade 21. The cutting blade 21 is placed in a state where the other end thereof is always brought into close contact with the end surface of the sheet plate 52 by the plurality of magnets 53.

On the other hand, the pressing plate 22B includes a first pressing plate 55A and a second pressing plate 55B, and it is disposed side by side along the width direction of the placement surface 51 so as to overlap the placing plate 22A.

If the first pressing plate 55A is specifically described, the first pressing plate is rotatably coupled to a shaft 56 fixed to the placing plate 22A. Additionally, a base end of the first pressing plate 55A is biased by a coil spring 57 interposed between the first pressing plate and the placing plates 22A. The first pressing plate 55A receives a spring force obtained by the coil spring 57, and rotates about the shaft 56, and a tip portion thereof is pushed toward the placement surface 51. As a result, as described above, the cutting blade 21 is pressed against and fixed to the placement surface 51.

Additionally, the first pressing plate 55A has the base end pushed with a force resisting the coil spring 57 by a rod (not shown) that operates under the instruction of the control unit 12. Accordingly, the tip portion of the first pressing plate rotates in a reverse direction about the shaft 56, and the pressing of the cutting blade 21 is appropriately released. The region of the cutting blade 21 pressed by the first pressing plate 55A is used when the embedded block B is cut, and is used for rough cutting.

In addition, since the second pressing plate 55B has the same configuration as the first pressing plate 55A, the description thereof will be omitted. Additionally, the region of the cutting blade 21 pressed by the second pressing plate 55B is used when the embedded block B is cut, and is used for main cutting.

Additionally, both the placing plate 22A and the pressing plate 22B have tips obliquely cut, and have a shape that is gradually sharpened toward the blade edge 21a of the cutting blade 21.

Figure 7:
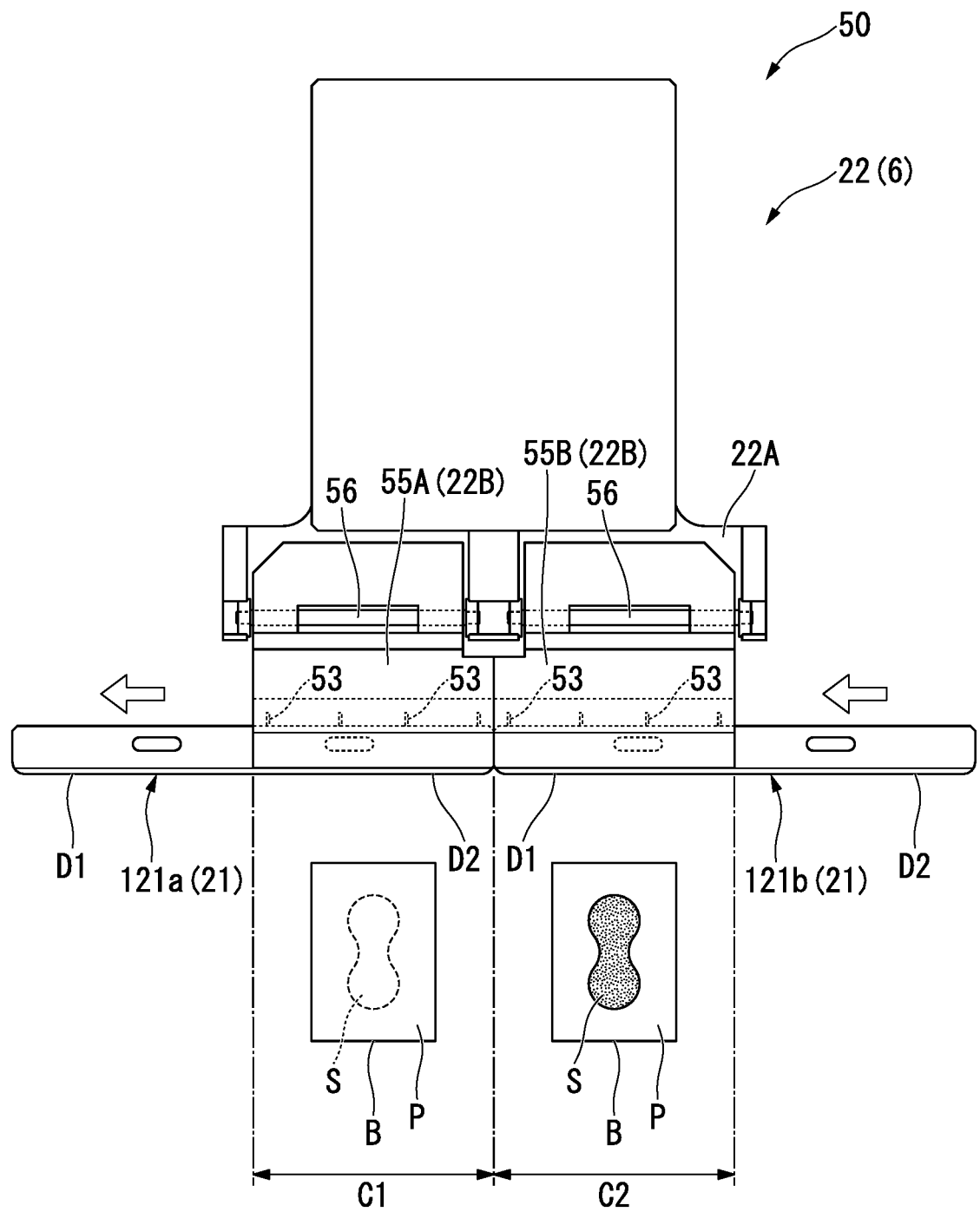
FIG. 7 is a plan view of the thin-section preparation device (holder) showing a two-blade set state.

Here, the holder 22 is configured so that switching is sequentially performed between the one-blade set state where the entire one cutting blade 21 in the blade edge direction is pressed by the first pressing plate 55A and the second pressing plate 55B under the instruction of the controller 12 and a two-blade set state where two cutting blades 21 are pressed by the first pressing plate 55A and the second pressing plate 55B, respectively, as shown in FIG. 7.

In other words, in the one-blade set state, the first pressing plate 55A and the second pressing plate 55B press the one cutting blade 21. On the other hand, in the two-blade set state, the first pressing plate 55A presses the one cutting blade 21, and the second pressing plate 55B presses another cutting blade 21.

Specifically, as shown in FIG. 4, the one-blade set state is a state where an entire first cutting blade 121a of the cutting blade 21 in the blade edge direction is placed on the placement surface 51. In the one-blade set state, one end region D1 in the blade edge direction is pressed by the first pressing plate 55A, and the other end region D2 is pressed by the second pressing plate 55B. In this case, the rough cutting is performed in the one end region D1 of the first cutting blade 121a that is pressed against the first pressing plate 55A, and the main cutting is performed in the other end region D2 that is pressed against the second pressing plate 55B.

On the other hand, as shown in FIG. 7, the two-blade set state is a state where the other end region D2 of the first cutting blade 121a and the one end region D1 of a second cutting blade 121b in the cutting blade 21 are placed on the placement surface 51. In the two-blade set state, the other end region D2 of the first cutting blade 121a is pressed by the first pressing plate 55A, and the one end region D1 of the second cutting blade 121b is pressed by the second pressing plate 55B.

That is, in the two-blade set state, the first cutting blade 121a is supported in a cantilevered manner in a state where the one end region D1 is made to protrude to the outside of the first pressing plate 55A, and the second cutting blade 121b is supported in a cantilevered manner in a state where the other end region D2 is made to protrude to the outside of the second pressing plate 55B. In this case, the rough cutting is performed in the other end region D2 of the first cutting blade 121a that is pressed by the first pressing plate 55A, and the main cutting is performed in the one end region D1 of the second cutting blade 121b that is pressed by the second pressing plate 55B.

In addition, as shown in FIG. 4, the stage 4 on which the embedded block B is placed, and the holder 22, are configured so as to be slidingly movable relative to each other along the width direction of the placement surface 51 under the instruction of the controller 12. Specifically, the stage 4 and the holder 22 are configured so as to move between a rough cutting position C1 (refer to FIGS. 6 and 7) where the first pressing plate 55A is located and a main cutting position C2 (refer to FIGS. 6 and 7) where the second pressing plate 55B is located, above a path of the direction of movement of the stage 4 by the above-described moving mechanism 23.

In this case, the controller 12 controls the relative sliding movement between the holder 22 and the stage 4 so that the main cutting is performed by the portion (for example, the other end region D2 of the first cutting blade 121a) of the cutting blade 21 that is pressed by the second pressing plate 55B after rough cutting of the embedded block B is performed by the portion (for example, the one end region D1 of the first cutting blade 121a) that is pressed by the first pressing plate 55A. In addition, even if only either of the holder 22 or the stage 4 slidingly moves along the width direction of the placement surface 51, both of the holder 22 and the stage 4 may slidingly move.

Additionally, the cutting blade transport mechanism 26 of the present embodiment slidingly moves the cutting blade 21 along the blade edge direction, thereby setting the new cutting blade 21 in the holder 22, and pushes out the used cutting blade 21 from the holder 22 by using the new cutting blade 21. Additionally, the cutting blade transport mechanism 26 transfers the cutting blade 21 under the instruction of the controller 12 when the sharpness of at least any one of the portion of the cutting blade 21 that is pressed by the first pressing plate 55A (for example, the one end region D1 of the first cutting blade 121a) and the portion (for example, the other end region D2 of the first cutting blade 121a) that is pressed by the second pressing plate 55B deteriorates.

The cutting blade transport mechanism 26 transfers the cutting blade 21 so as to feed out the cutting blade at every half (half pitch) of a length along the blade edge direction under the instruction of the controller 12 when the cutting blade 21 is replaced.

<Operation of Automatic Thin-Cutting Device>

Next, the operation of the automatic thin-cutting device 1 configured as described above will be described.

Moreover, in the present embodiment, first, the overall flow until the thin section sample H is prepared is simply described, and thereafter, the flow of the partial process will be described in detail.

First, as advance preparation, the operator stores cassettes K, to which embedding blocks B are fixed, in the plurality of magazines 2, and thereafter, the operator opens the access door 11a of the device case 11, and mounts the magazines 2 on the carousel 3. After each magazine 2 is mounted on the carousel 3, the access door 11a is closed. In addition, the operator confirms whether or not the cutting blade 21 is appropriately set into the storage case 25, whether or not the slide glass G is appropriately set to the slide glass storage portion 31, whether or not the basket J is appropriately set to the basket storage portion 36, or the like, and thus, the advance preparation ends.

After the advance preparation ends, the operator starts the operation of each component in the device case 11 through the controller 12.

Then, the controller 12 sequentially rotates the carousels 3 and reads the ID data by the reading portion 20, and thereafter, the embedding block B is held by the block transport mechanism 5 using the hand portion 5A. Subsequently, after the held embedding block B is extracted from the magazine 2 by the block transport mechanism 5, the embedding block B is placed on the stage 4 via the cassette K.

When the setting operation of the embedding block B on the stage 4 ends, the controller 12 starts the thin-cutting operation of the embedding block B.

First, the upper surface of the embedding block B is adjusted to a desired height position by adjusting the height of the stage 4. In addition, the moving mechanism 23 of the thin-cutting mechanism 6 reciprocates the stage 4, and thus, the embedding block B is thinly cut by the cutting blade 21 which is clamped-fixed by the holder 22. Accordingly, it is possible to perform rough-flattening of the embedding block B.

When the thin-cutting is performed, the first imaging camera 27 images the embedding block B. This captured image is recorded in the controller 12 and is displayed on the monitor 12a. Accordingly, the operator can confirm the surface state or the internal state of the embedding block B by the captured image which is displayed on the monitor 12a. Moreover, with reference to the captured image, it is possible to incline or rotate an appropriate stage 4 during the thin-cutting. As a result, it is possible to expose an optimal surface to the surface by rough machining of the embedding block B.

In addition, when a flattening operation is performed by the above-described rough machining, the operation in which the thin section M is conveyed to the storage tank 7 by the thin section conveying mechanism 8 is not performed. Accordingly, the thin section M generated during this process becomes cutting chips and is collected to a collection portion (not shown).

Subsequently, after the flattening of the embedding block B ends, the controller 12 transfers the operation of the automatic thin-cutting device 1 from the rough machining operation to a main machining operation.

When the operation is transferred to the main machining operation, the controller 12 prepares the thin section M by the thin-cutting mechanism 6, conveys the prepared thin section M to the storage tank 7 by the thin section conveying mechanism 8, and floats the thin section on the liquid surface. Accordingly, the thin section M is spread, and curling or the like generated during the thin-cutting is removed.

Subsequently, the controller 12 operates the slide glass handling mechanism 9, scoops the thin section M floating on the liquid surface onto the slide glass G, and prepares the thin section sample H. The slide glass handling mechanism 9 places the prepared thin section sample H on the sample conveyance belt 30 and delivers the thin section sample H.

Moreover, the controller 12 drives the driving pulley 32A, and conveys the thin section sample H placed on the sample conveyance belt 30 toward the downstream side. Then, while the thin section sample H is conveyed up to the hot plate 33, the second imaging camera 34 images the thin section M, and the captured image is sent to the controller 12.

Based on the captured image sent from the second imaging camera 34, the controller 12 determines whether or not the thin section M subjected to the main machining is appropriately cut thinly. Here, when the controller 12 determines that the thin-cutting is good, the controller 12 operates the recording portion 35, the individual data associated with the ID data read from the cassette K is recorded in the slide glass G of the thin section sample H.

In addition, the thin section sample H in which the individual data is recorded is further conveyed to the downstream side of the sample conveyance belt 30 and is heated by the hot plate 33. Moreover, the controller 12 operates the slide glass storage mechanism 10 and stores the heated thin section sample H in the basket J.

On the other hand, as the determination result with respect to the quality of thin-cutting, when the controller 12 determines that the thin-cutting is not good, the controller 12 does not operate the slide glass storage mechanism 10, and delivers the thin section sample H from the sample conveyance belt 30 to a defective product discharging chute (not shown). Accordingly, the thin section sample H which is the defective product is not stored in the basket J and is collected.

When the thin section samples H which are determined as good products are stored in the basket J by a predetermined number, the basket J is sent to the storage cabinet and is stored, the basket supply mechanism 37 extracts a new basket J from the basket storage portion 36 and sets the new basket J at the sample storage position P1, and subsequent storage operations are prepared.

As described above, according to the automatic thin-cutting device 1 of the present embodiment, not only the thin section M is automatically prepared but also the thin section sample H is automatically prepared, and it is possible to store the thin section samples H in the basket J by a predetermined number.

Accordingly, the operator can transfer the basket J to the dyeing process of the biological sample S directly by extracting the appropriate basket J from the storage cabinet, and the basket J is remarkably easily used. Particularly, since it is possible to integrate the thin section samples H, in which the same dyeing operation is performed, in the same basket J, high degree of convenience is obtained.

Figure 6:
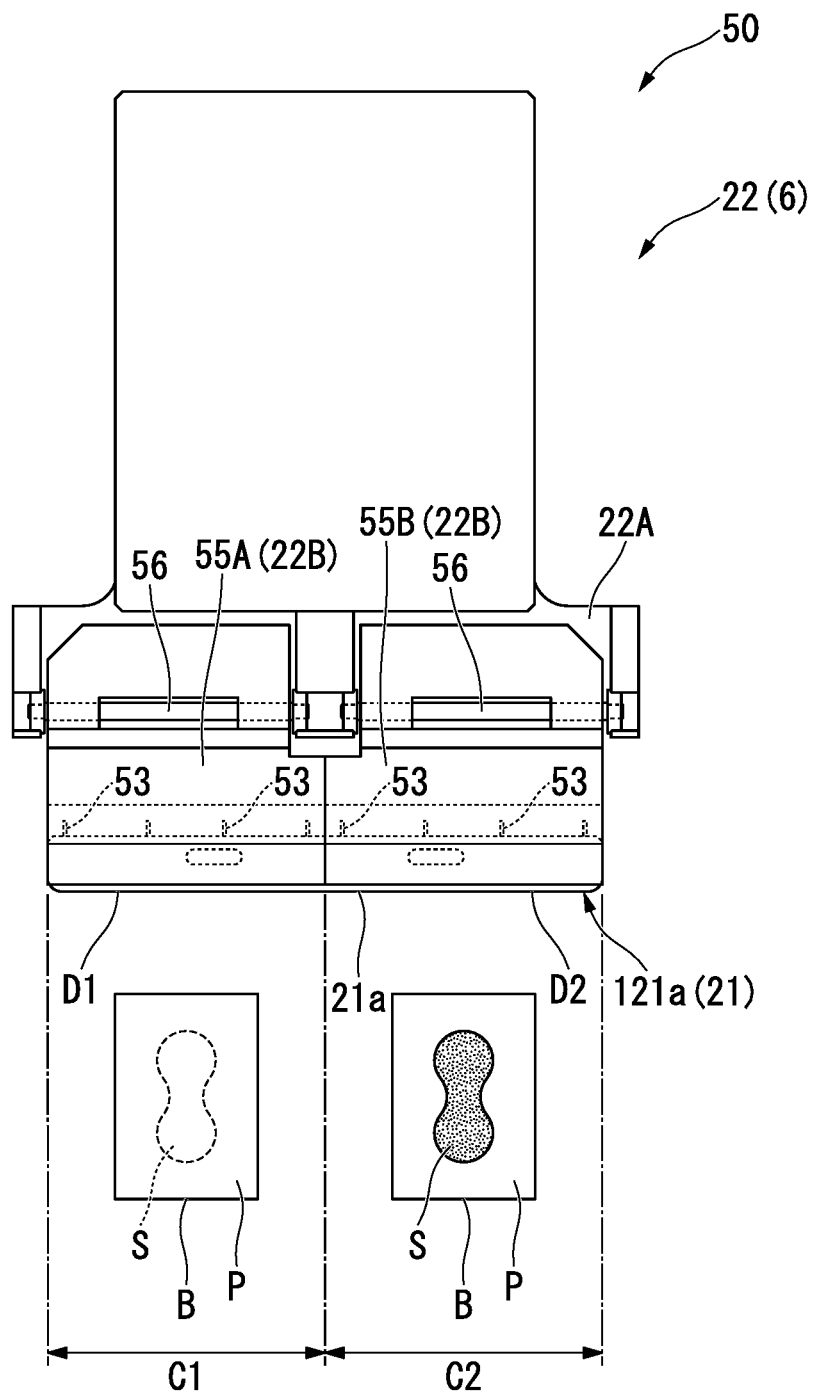
FIG. 6 is a plan view of the thin-section preparation device (holder) showing a one-blade set state.

Here, the operation of the above-described thin-section preparation device 50 will be described in detail. FIG. 6 is a plan view of the thin-section preparation device 50 (holder 22) showing the one-blade set state. FIG. 7 is a plan view of the thin-section preparation device 50 (holder 22) showing the two-blade set state.

The thin cutting work of the present embodiment is performed by sequentially repeating a first rough cutting step of performing the rough cutting in the one end region D1 of the first cutting blade 121a and a first main cutting step of performing the main cutting in the other end region D2 of the first cutting blade 121a, in the above-described one-blade set state shown in FIG. 6, and a second rough cutting step of performing the rough cutting in the other end region D2 of the first cutting blade 121a and a second main cutting step of performing the main cutting in the one end region D1 of the second cutting blade 121b, in the two-blade set state shown in FIG. 7. In the following description, it will be described that the above-described one-blade set state as being an initial state, that is, a state where the entire first cutting blade 121a in the blade edge direction is pressed by the first pressing plate 55A and the second pressing plate 55B.

As shown in FIG. 6, first, in the first rough cutting step, the rough cutting of the embedded block B is performed in the one end region D1 of the first cutting blade 121a, which is pressed against the first pressing plate 55A, by reciprocating the stage 4 in a state where the stage 4 and the holder 22 are arranged at the above-described rough cutting position C1.

Next, in the first main cutting step, the main cutting of the embedded block B is performed in the other end region D2 of the first cutting blade 121a, which is pressed against the second pressing plate 55B, by reciprocating the stage 4 in the state where the stage 4 and the holder 22 are arranged at the above-described main cutting position C2. Accordingly, the thin section M can be obtained as described above.

Then, the controller 12 performs the replacing work of the cutting blade 21 after the above-described first main cutting step.

Specifically, the controller 12 actuates the rod (not shown) so as to push the base ends of the first pressing plate 55A and the second pressing plate 55B with a force resisting the coil spring 57. Accordingly, the pressing of the first cutting blade 121a can be released. Additionally, the controller 12 actuates the cutting blade transport mechanism 26 simultaneously with this so as to transfer a new cutting blade (the second cutting blade 121b) to the placement surface 51. In this case, the cutting blade transport mechanism 26 transfers the second cutting blade 121b by only a half pitch along the blade edge direction.

Then, the first cutting blade 121a that is already placed on the placement surface 51 is pushed out along the blade edge direction by the second cutting blade 121b, and is transferred by only a half pitch, similar to the second cutting blade 121b. That is, as shown in FIG. 7, the other end region D2 of the first cutting blade 121a and the one end region D1 of the second cutting blade 121b are brought into the state of being placed on the placement surface 51. In this state, the first cutting blade 121a is pressed by the first pressing plate 55A, and the second cutting blade 121b is pressed by the second pressing plate 55B. Accordingly, the two-blade set state where the other end region D2 of the first cutting blade 121a is pressed by the first pressing plate 55A and the one end region D1 of the second cutting blade 121b is pressed by the second pressing plate 55B is brought about.

In addition, since the first cutting blade 121a and the second cutting blade 121b that are placed on the placement surface 51 are held in a state where the posture thereof is stable by the magnets 53, even in a case where the pressing using the first pressing plate 55A and the second pressing plate 55B is released, the first cutting blade 121a and the second cutting blade 121b are always held in a state where the base ends thereof are brought into close contact with the end surface of the sheet plate 52.

Additionally, the replacement of the first cutting blade 121a and the second cutting blade 121b may be performed whenever cutting is performed a predetermined number of times, and may be performed under the instruction of the controller 12 when the sharpness of at least any one of the portion pressed by the first pressing plate 55A and the portion pressed by the second pressing plate 55B deteriorates.

Then, in the second rough cutting step, the rough cutting of the embedded block B is performed in the other end region D2 of the first cutting blade 121a, which is pressed by the first pressing plate 55A, by reciprocating the stage 4 in a state where the stage 4 and the holder 22 are arranged at the above-described rough cutting position C1. That is, the second rough cutting step is performed in the region (other end region D2) of the first cutting blade 121a that is used in the above-described first main cutting step.

Next, in the second main cutting step, the main cutting of the embedded block B is performed in the one end region D1 of the second cutting blade 121b, which is pressed against the second pressing plate 55B, by reciprocating the stage 4 in the state where the stage 4 and the holder 22 are arranged at the above-described main cutting position C2. Accordingly, the thin section M can be obtained as described above.

Thereafter, the second cutting blade 121b is fed out by a half pitch along the blade edge direction by a new cutting blade 21 by repeating the above-described replacing work and feeding out the new cutting blade 21 by a half pitch toward the placement surface 51 using the cutting blade transport mechanism 26. Accordingly, the entire of the second cutting blade 121b along the blade edge direction is placed on the placement surface 51, and the first cutting blade 121a is pushed by the second cutting blade 121b, separated from the holder 22 and is discarded to the discard bottle (not shown).

Thereafter, the second cutting blade 121b placed on the placement surface 51 is pressed by the first pressing plate 55A and the second pressing plate 55B, and the above-described first rough cutting step and the above-described first main cutting step are repeated in a place where the one-blade set state is again brought about. That is, the rough cutting is performed in the one end region D1 of the second cutting blade 121b, and the main cutting is performed in the other end region D2.

Thereafter, by repeatedly performing the above-described work, the cutting of the embedded block B is performed while the one-blade set state and the two-blade set state are repeated.

In this way, according to the present embodiment, the cutting blade 21 can be effectively used by separately performing the rough cutting and the main cutting in the one end region D1 and the other end region D2 among the one cutting blade 21 and then using the portion of the cutting blade 21 which was used for the main cutting as for the rough cutting with lower precision compared to the main cutting. Therefore, the running costs of the automatic thin-cutting device 1 when the thin section specimen H is prepared can be reduced.

Additionally, by performing switching between the one-blade set state where the entire first cutting blade 121a in the blade edge direction is held and the two-blade set state where the other end region D2 of the first cutting blade 121a and the one end region D1 of the second cutting blade 121b are held, the two cutting blades 21 can be held by the holder 22 having the same width as that of the one cutting blade 21. Accordingly, miniaturization of the holder 22 is achieved, and the rigidity of the holder 22 can be improved with this miniaturization.

Additionally, in the present embodiment, the pressing plate 22B of the holder 22 includes the first pressing plate 55A and the second pressing plate 55B. Therefore, when two different cutting blades 21 are fixed to the holder 22 in the above-described two-blade set state, the cutting blades 21 can be respectively pressed by the separate first pressing plate 55A and the separate second pressing plate 55B. Accordingly, the dimensional errors of the respective cutting blades 21 in the thickness direction can be absorbed, and the respective cutting blades 21 can be stably held even in the two-blade set state.

In addition, the technical scope of the invention is not limited to the above-described respective embodiments, and various changes can be made to the above-described embodiments without departing from the scope of the invention. That is, the configurations mentioned in the above-described embodiments are merely examples, and can be appropriately changed.

For example, although a configuration in which the pressing plate 22B is split into the first pressing plate 55A and the second pressing plate 55B has been described in the above-described embodiment, the invention is not limited to this, and only one pressing plate 22B having the same width as that of the placing plate 22A may be adopted.

Additionally, although a configuration in which the cutting blades 21 are sequentially slidingly moved along the blade edge direction by the cutting blade transport mechanism 26 has been described in the above-described embodiment, the invention is not limited to this.

Moreover, although a case where the thin-section preparation device 50 related to the aspect of the invention is assembled into the automatic thin-cutting device 1 has been described in the above-described embodiment, the invention is not limited to this and the thin-section preparation device 50 may be used alone.

Additionally, although a state where the six magazines 2 are simultaneously mounted on the carousel 3 has been described as an example in the above-described embodiment, the invention is not limited to this.

According to an embodiment of the invention, the thin-section preparation method is a thin-section preparation method of preparing a thin section by detachably holding a cutting blade by the holder in a state where the blade edge is exposed to an outside, and cutting the embedded block, in which a biological sample is embedded, by using the cutting blade, the cutting blade including the blade edge and being long in the blade edge direction. The thin-section preparation method includes a first rough cutting step of performing rough cutting of the embedded block in one end region of a first cutting blade along a blade edge direction, in a one-blade set state where entire of the first cutting blade of the cutting blade is held by a holder in the blade edge direction; a first main cutting step of performing main cutting of the embedded block which has been performed rough cutting in another end region of the first cutting blade along the blade edge direction in the one-blade set state; a second rough cutting step of performing rough cutting of the embedded block in the other end region of the first cutting blade, in a two-blade set state where the other end region of the first cutting blade and one end region of a second cutting blade of the cutting blade along the blade edge direction are held by the holder; and a second main cutting step of performing main cutting of the embedded block in the one end region of the second cutting blade in the two-blade set state.

REFERENCE SIGNS LIST

21: CUTTING BLADE
21a: BLADE EDGE
22: HOLDER
22A: PLACING PLATE
22B: PRESSING PLATE
50: THIN-SECTION PREPARATION DEVICE
51: PLACEMENT SURFACE
55A: FIRST PRESSING PLATE
55B: SECOND PRESSING PLATE
121a: FIRST CUTTING BLADE
121b: SECOND CUTTING BLADE
D1: ONE END REGION
D2: OTHER END REGION
M: THIN SECTION
S: BIOLOGICAL SAMPLE

The invention claimed is:

1. A thin-section preparation method for preparing a thin section by cutting an embedded block using a plurality of cutting blades held by a holder, the plurality of cutting blades all having a same width and comprising a first cutting blade and a second cutting blade, the first cutting blade having a first end region and a second end region and the second cutting blade having a third end region and a fourth end region, the thin-section preparation method comprising:
  a cutting blade holding step that switches between a one-blade set state and a two-blade set state by using the holder, the holder comprising a pressing plate including a tip portion and a placing plate including a placement surface, the tip portion and the placement surface configured to be disposed on opposite sides of the first cutting blade and/or the second cutting blade, wherein a width of the placement surface is equal to the width each of the plurality of cutting blades, and wherein the pressing plate includes a first pressing plate and a second pressing plate disposed side by side along the width of the placement surface so as to overlap the placing plate,
  wherein a combined width of a width of the first pressing plate and a width of the second pressing plate is equal to the width of the placement surface and wherein the combined width of the width of the first pressing plate and the width of the second pressing plate is equal to the width each of the plurality of cutting blades;
  wherein, in the one-blade set state, the holder holds only the first cutting blade of the plurality of cutting blades such that the first end region and the second end region of the first cutting blade are disposed between the first pressing plate and the placing plate, and between the second pressing plate and the placing plate, respectively, and
  wherein, in the two-blade set state, the holder holds the second end region of the first cutting blade and the third end region of the second cutting blade such that the second end region and third end region are disposed between the first pressing plate and the placing plate, and between the second pressing plate and the placing plate, respectively, and the first end region and the fourth end region are not disposed between the first pressing plate and the placing plate, and between the second pressing plate and the placing plate, respectively,
  the one-blade set state being switched to the two-blade set state by pressing out the first end region of the first cutting blade from the holder in the one-blade set state using the third end region of the second cutting blade,
  a first rough cutting step of performing rough cutting of the embedded block in the first end region of the first cutting blade, in the one-blade set state;
  a first main cutting step of performing main cutting of the embedded block on which the first rough cutting step has been performed, in the second end region of the first cutting blade, in the one-blade set state;
  a second rough cutting step of performing rough cutting of the embedded block in the second end region of the first cutting blade used in the first main cutting step, in the two-blade set state; and
  a second main cutting step of performing main cutting of the embedded block on which the second rough cutting step has been performed, in the third end region of the second cutting blade, in the two-blade set state.

2. The thin-section preparation method according to claim 1, wherein the thin section is prepared by detachably holding one or more of the plurality of cutting blades by the holder in a state where a blade edge of the held one or more cutting blades is exposed to an outside of the holder, and cutting the embedded block, in which a biological sample is embedded, by using the held one or more cutting blades, the blade edge of the held one or more cutting blades extending in a blade edge direction.

3. The thin-section preparation method according to claim 1, wherein a blade edge of the first cutting blade extends continuously from the first end region to the second end region and wherein a blade edge of the second cutting blade extends continuously from the third end region to the fourth end region.

4. The thin-section preparation method according to claim 3, wherein in the two-blade set state, the second end region of the first cutting blade abuts against the third end region of the second cutting blade, the thin-section preparation device further comprising an interruption between the blade edge of the first cutting blade and the blade edge of the second cutting blade.

5. The thin-section preparation method according to claim 1, wherein in the two-blade set state, a second half of the first cutting blade and a first half of the second cutting blade are positioned such that the second end region and third end region are disposed between the first pressing plate and the placing plate, and between the second pressing plate and the placing plate, respectively, and a first half of first cutting blade and a second half of the second cutting blade are not disposed between the first pressing plate and the placing plate, and between the second pressing plate and the placing plate, respectively.

6. The thin-section preparation method according to claim 1, wherein during the two-blade set state:
  the first pressing plate holds the first cutting blade when the second rough cutting is performed; and
  the second pressing plate holds the second cutting blade when the second main cutting is performed.

7. A thin-section preparation device comprising:
  a plurality of cutting blades all having a same width and comprising a first cutting blade and a second cutting blade, the first cutting blade having a first end region and a second end region and the second cutting blade having a third end region and a fourth end region, wherein each of said plurality of cutting blades has a blade edge extending in a blade edge direction for cutting an embedded block in which a biological sample is embedded;
  a holder comprising a pressing plate including a tip portion and a placing plate including a placement surface, the tip portion and the placement surface configured to be disposed on opposite sides of the first cutting blade and/or the second cutting blade and configured to detachably hold one or more of the plurality of cutting blades in a state where the blade edge of the held one or more cutting blades is exposed to an outside of the holder, wherein a width of the placement surface is equal to the width of each of the plurality of cutting blades, and wherein the pressing plate includes a first pressing plate and a second pressing plate disposed side by side along the width of the placement surface so as to overlap the placing plate;
  a cutting blade transport mechanism that transfers the plurality of cutting blades to the holder; and
  a controller that controls at least operations of the holder and the cutting blade transport mechanism;
  wherein the controller switches between a one-blade set state and a two-blade set state of the holder by using the plurality of cutting blades transferred by the cutting blade transport mechanism, wherein, in the one-blade set state, the holder holds only the first cutting blade of the plurality of cutting blades such that the first end region and the second end region of the first cutting blade are disposed between the first pressing plate and the placing plate, and between the second pressing plate and the placing plate, respectively, wherein in the two-blade set state, the holder holds the second end region of the first cutting blade and the third end region of the second cutting blade such that the second end region and third end region are disposed between the first pressing plate and the placing plate, and between the second pressing plate and the placing plate, respectively, and the first end region and the fourth end region are not disposed between the first pressing plate and the placing plate, and between the second pressing plate and the placing plate, respectively, as a result of pressing out the first end region of the first cutting blade from the holder in the one-blade set state by using the second cutting blade, wherein a combined width of a width of the first pressing plate and a width of the second pressing plate is equal to the width of the placement surface and wherein the combined width of the width of the first pressing plate and the width of the second pressing plate is equal to the width each of the plurality of cutting blades;

wherein the controller, in the one-blade set state, controls a first rough cutting with respect to the embedded block in the first end region of the first cutting blade and performs a first main cutting with respect to the embedded block on which the first rough cutting has been performed in the second end region of the first cutting blade, and wherein the controller, in the two-blade set state, controls a second rough cutting with respect to the embedded block in the second end region of the first cutting blade used in the first main cutting and performs a second main cutting with respect to the embedded block on which the second rough cutting has been performed in the third end region of the second cutting blade.

8. The thin-section preparation device according to claim 7, wherein during the one-blade set the pressing plate includes:
   the first pressing plate that holds the first a region of one or more of the plurality of cutting blade when in which rough cutting is performed; and
   the second pressing plate that holds the first a region of one or more of the plurality of cutting blade when in which main cutting is performed.

9. The thin-section preparation device according to claim 7, wherein the blade edge of the first cutting blade extends continuously from the first end region to the second end region and wherein the blade edge of the second cutting blade extends continuously from the third end region to the fourth end region.

10. The thin-section preparation device according to claim 9, wherein in the two-blade set state, the second end region of the first cutting blade abuts against the third end region of the second cutting blade.

11. The thin-section preparation device according to claim 7, wherein in the two-blade set state, a second half of the first cutting blade and a first half of the second cutting blade are positioned such that the second end region and third end region are disposed between the first pressing plate and the placing plate, and between the second pressing plate and the placing plate, respectively, and a first half of first cutting blade and a second half of the second cutting blade are not disposed between the first pressing plate and the placing plate, and between the second pressing plate and the placing plate respectively.

* * * * *